May 20, 1924.

R. F. MacMICHAEL

SMOKE TESTING APPARATUS

Original Filed Sept. 19 1919    5 Sheets—Sheet 1

1,494,855

INVENTOR
Ross F. MacMichael
BY
Albert M. Austin
ATTORNEYS

May 20, 1924.

R. F. MacMICHAEL

SMOKE TESTING APPARATUS

Original Filed Sept. 19, 1919  5 Sheets-Sheet 2

1,494,855

INVENTOR
Ross F. MacMichael
BY
Albert M. Austin
ATTORNEY

May 20, 1924.
R. F. MacMICHAEL
SMOKE TESTING APPARATUS
Original Filed Sept. 19, 1919    5 Sheets—Sheet 5
1,494,855
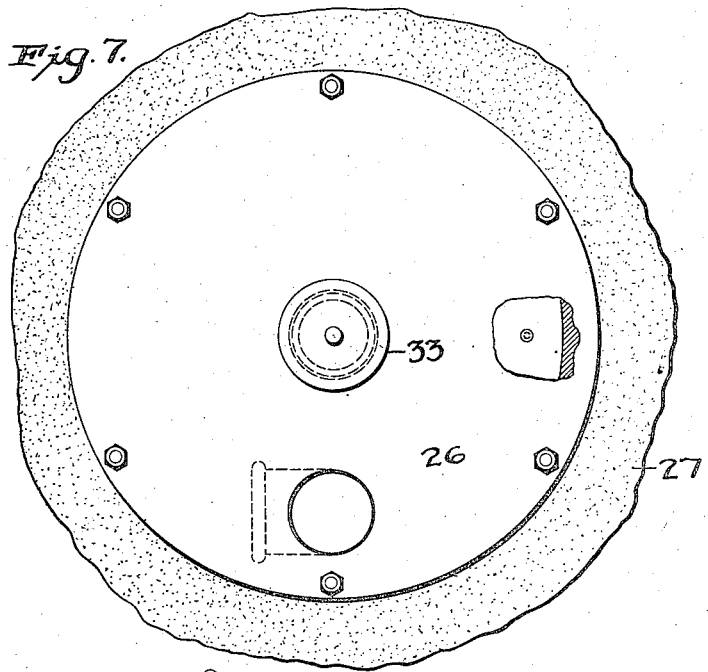
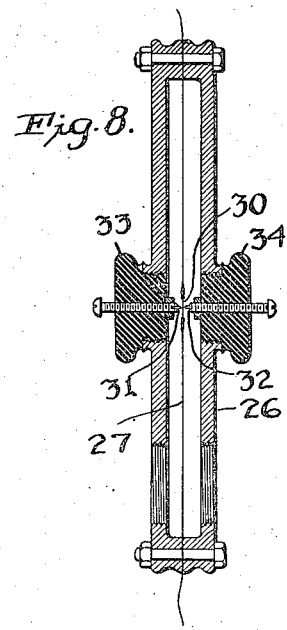
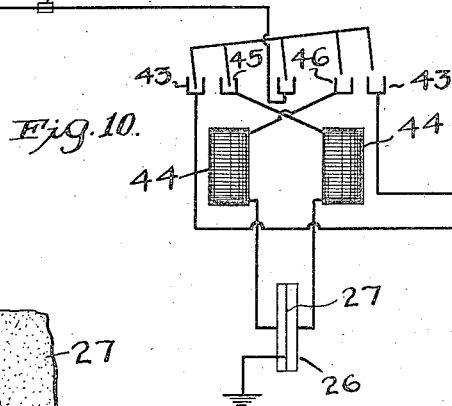
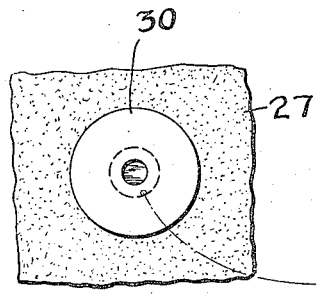
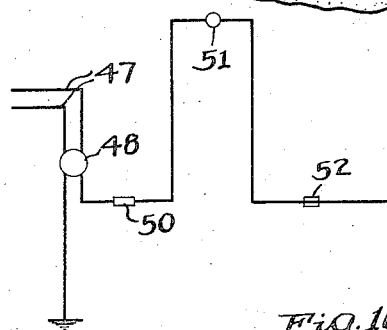
Inventor
Ross F. MacMichael
By his Attorney
Albert M. Austin Patented May 20, 1924.

1,494,855

UNITED STATES PATENT OFFICE.

ROSS F. MacMICHAEL, OF EL PASO, TEXAS, ASSIGNOR TO AMERICAN SMELTING AND REFINING COMPANY, OF NEW YORK, N. Y., A CORPORATION OF NEW JERSEY.

SMOKE-TESTING APPARATUS.

Application filed September 19, 1919, Serial No. 325,000. Renewed February 14, 1923.

*To all whom it may concern:*

Be it known that I, Ross F. MacMichael, a citizen of the United States, and resident of El Paso, in the county of El Paso and State of Texas, have invented certain new and useful Improvements in Smoke-Testing Apparatus, of which the following is a specification.

The invention relates in general to an apparatus for testing smoke and other gaseous bodies and particularly relates to an apparatus for continuously taking samples of gases from passageways or smoke from stacks, such as smelter's stacks in metallurgical plants so as to ascertain the nature, quantity and value of the ore particles and other suspended matter carried away through the stack.

The primary object of the invention is to provide a simple form of device for continuously, automatically, accurately and inexpensively testing the smoke in such a manner that the results will be independent of variation in velocity, temperature, humidity, draft or dust contents of the smoke or gases.

Broadly, I attain this object by positioning in the stack an intake, the area of which compared to the discharging area of the stack is known, and to provide means for drawing the smoke into said intake at the average stack velocity. Then by analyzing the sample thus attained over a given period of time the contents of the entire stack discharge during said period of time can be readily calculated.

Incidental to the object of maintaining average stack velocity at the intake, the invention contemplates the use of a suction fan for maintaining the reduced pressure conditions in the intake, and a valve positioned between the intake and fan is controlled by variation of pressure conditions in the stack so that a sub-normal pressure condition in the stack will tend to more fully open the valve and a supernormal pressure condition in the stack will conversely tend to close the valve.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figures 7 and 8 are respectively front and transverse sectional views of the circuit closing diaphragm and its containing casing;

Figure 9 is a an enlarged view of one of the contacts shown in Figures 7 and 8; and Figure 10 is a view largely diagrammatic showing the wiring of the electrical apparatus disclosed in the preceding figures.

In the following description and in the claims, parts will be identified by specific names for convenience of expression but they are intended to be as generic in their application to similar parts as the art will permit.

Figure 1:
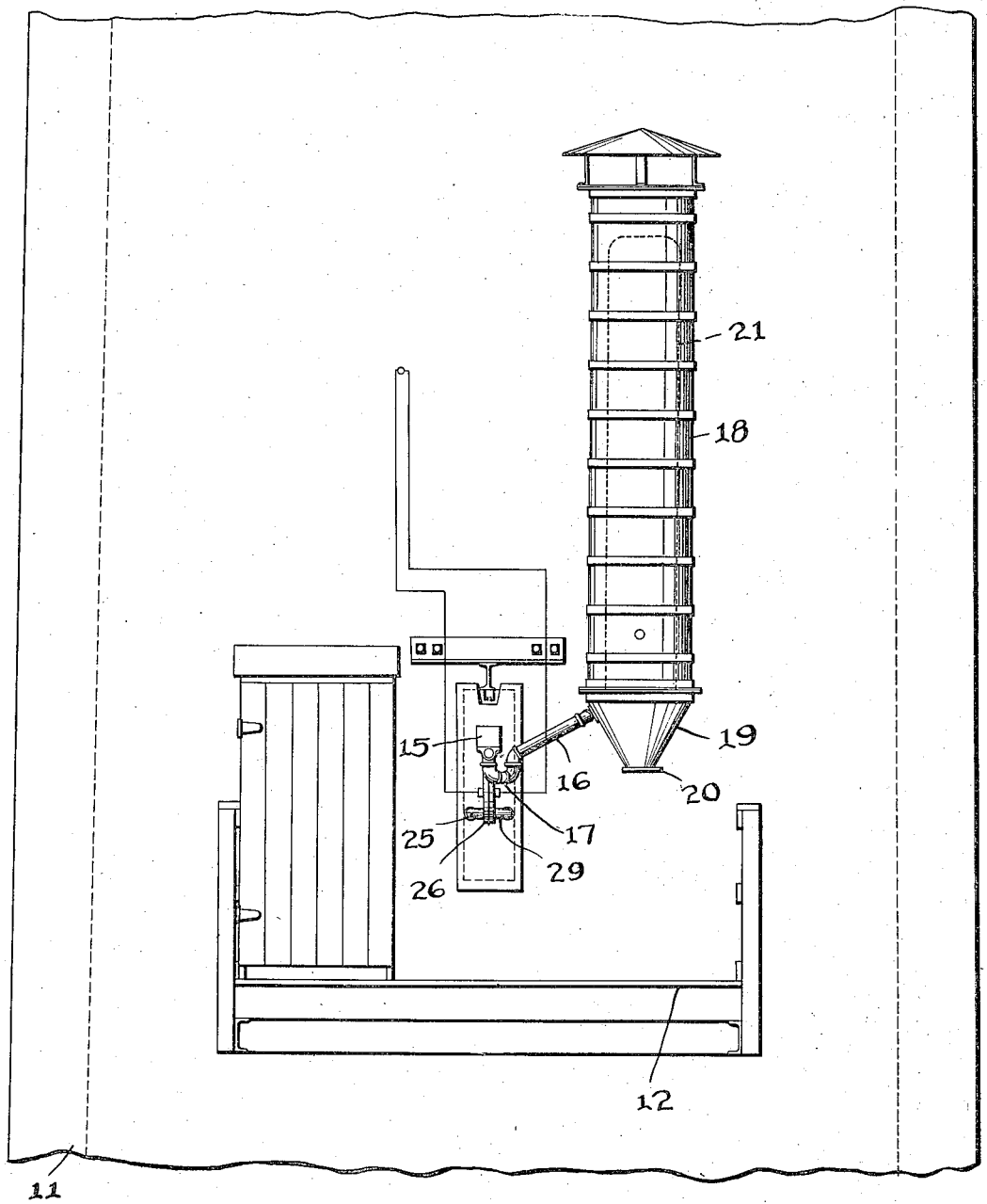
Figure 1 is a view in side elevation of a portion of a stack showing a preferred embodiment of the invention applied thereto.
Figure 3:
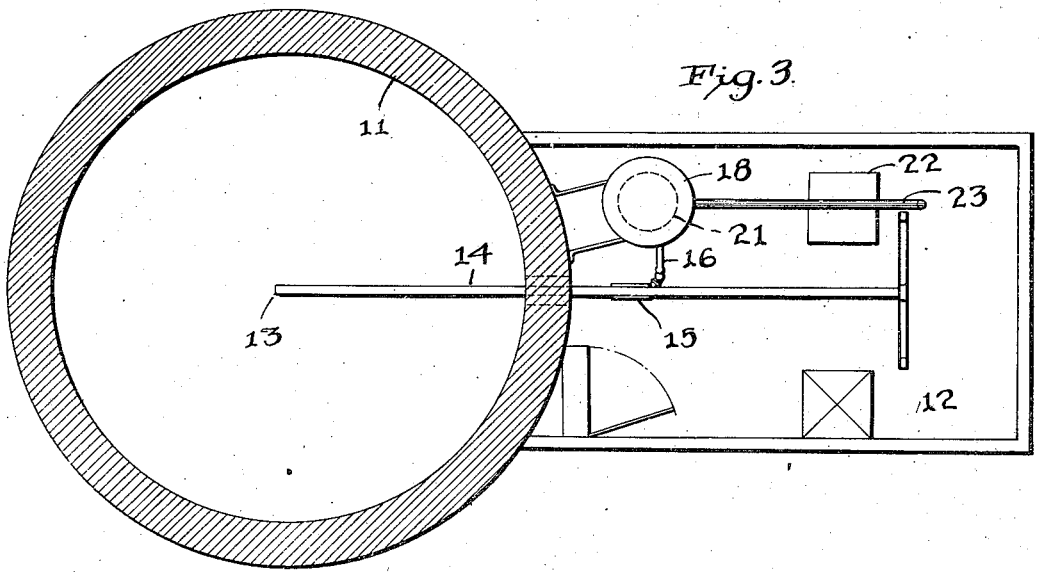
Figure 3 is a horizontal sectional view taken on the line 3—3 of Figure 2.
Figure 2:
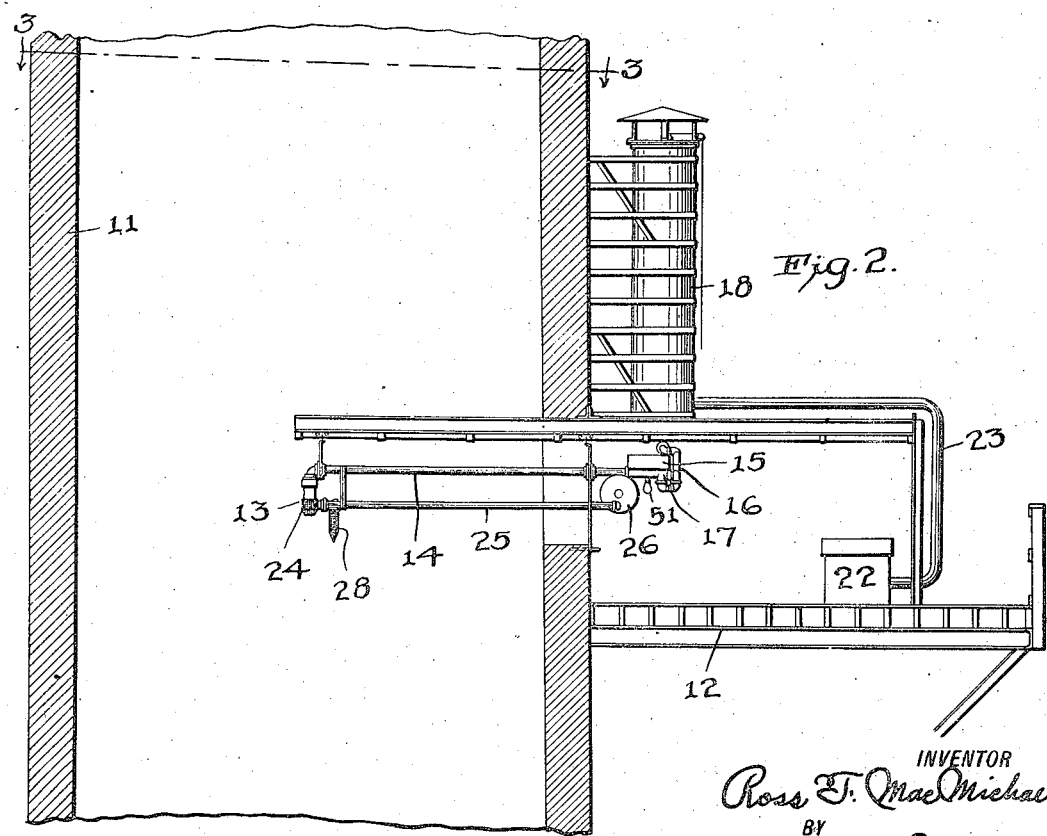
Figure 2 is an axial sectional view through the chimney shown in Figure 1 and showing the attachment on a reduced scale and in side elevation.

In the drawings, there is shown a stack 11 which for the purpose of this disclosure may be regarded as the smoke discharge stack of a metallurgical smelter. A working platform 12 is located approximately half-way up the stack and provides a support for the part of the apparatus mounted exteriorly of the stack. The apparatus includes a sample intake tube 13 connected by means of a pipe 14 and a controlling throttle valve 15 to the pipe 16, positioned exteriorly of the stack. This pipe 16 is provided with a disconnecting joint 17 so as to facilitate the removal of the pipe from a bag containing tank 18, supported from the platform. The tank is provided with a removable counter-balance hopper bottom 19 having a gate 20 for the removal of dust filtered from the smoke or gases passed thereto. A bag 21 (shown in dotted lines in Figure 1) of filtering material, preferably the usual cotton, wool or asbestos bag generally used in such locations, is arranged within the tank and disposed so that the gases pass from the inside to the outside of the bag. During this movement the dust and fine particles are trapped in their passage through the tank. An exhaust fan 22 acts on the filtered gases in the tank to draw the same through the discharge pipe 23 and to discharge the same free of the smoke particles into the atmosphere.

Figure 4:
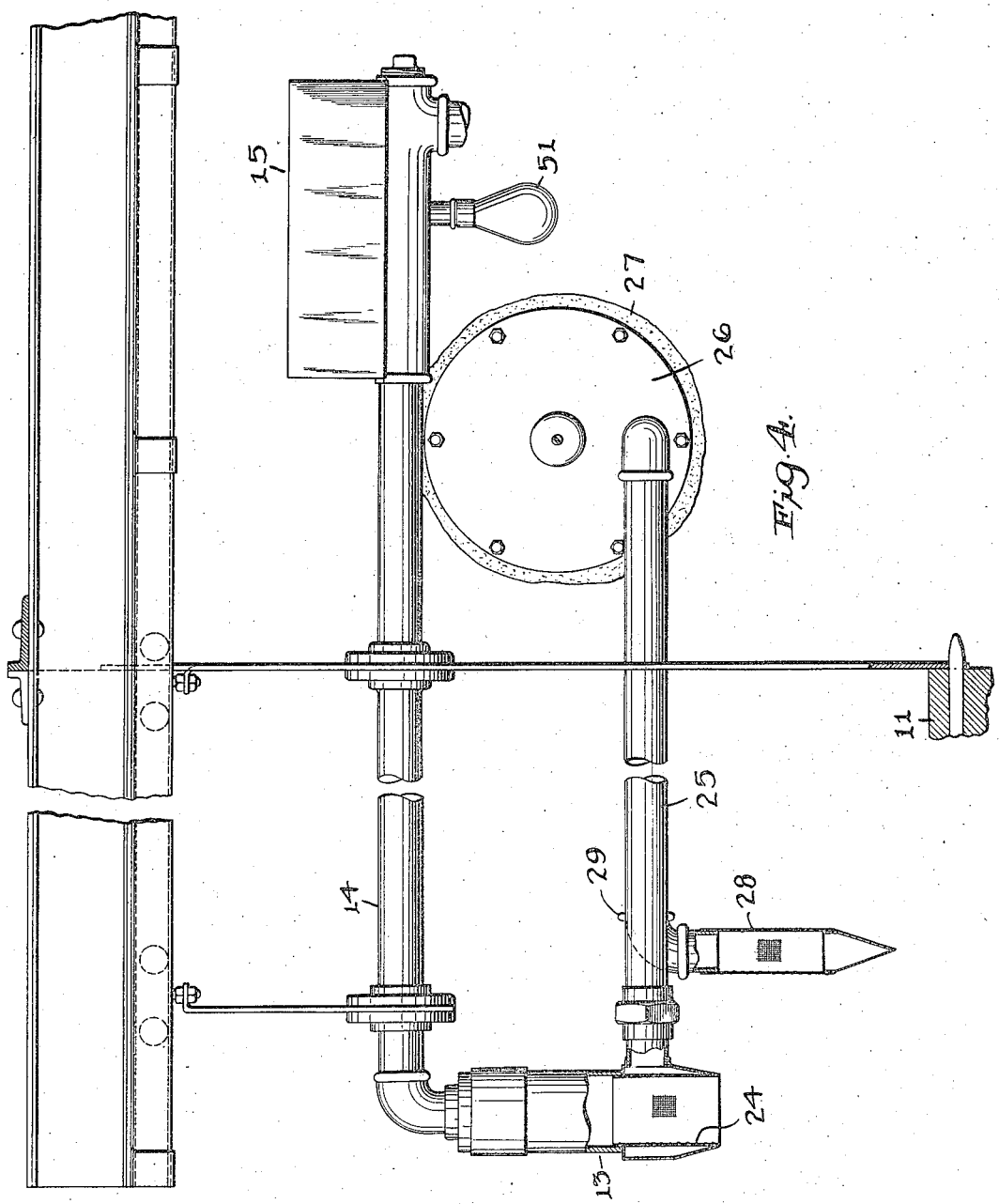
Figure 4 is an enlarged view partly in section of certain of the parts shown in Figure 2.

Referring particularly to Figure 4 it is noted that the intake 13 is provided with a metal screen 24 which connects by means of a pipe 25 with one side of a diaphragm casing 26 provided with a circuit controlling diaphragm 27. It is obvious that by this construction the diaphragm is effected by the static pressure within and at the entrance of the intake tube. A second screen 28 extends a short distance into the stack below the intake 13 and connects by means of a pipe 29 with the opposite side of the diaphragm. By this construction it is apparent that this opposite side of the diaphragm is affected by the static pressure in the stack adjacent the intake screen 28.

The diaphragm 27, mounted within the casing 26, as shown in Figure 8, is of suitable material, such as a piece of closely-woven fabric and carries centrally thereon a platinum disk 30 grounded as shown in Figure 11 and adapted in its transverse swing to contact with either of the platinum points 31 or 32 carried respectively by the removable bakelite knobs 33 and 34 screwed into opposite sides of the casing 26.

Figure 5:
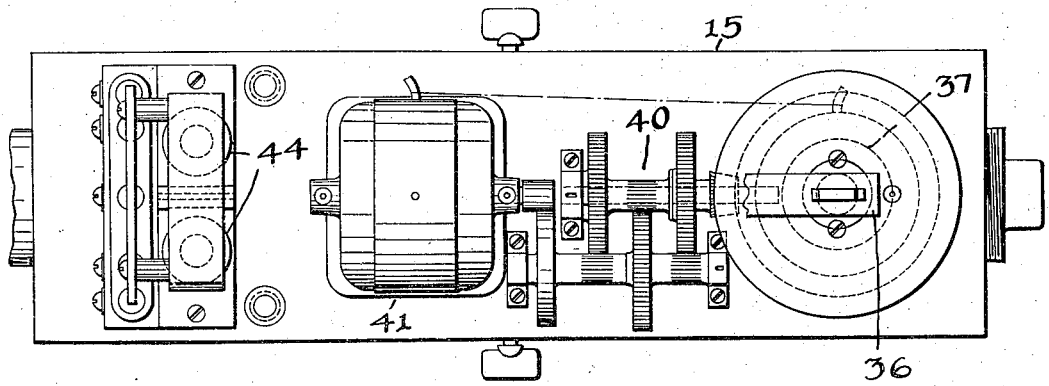
Figures 5 and 6 are respectively a plan view and a longitudinal sectional view of the throttle valve and its controlling motor.
Figure 6:
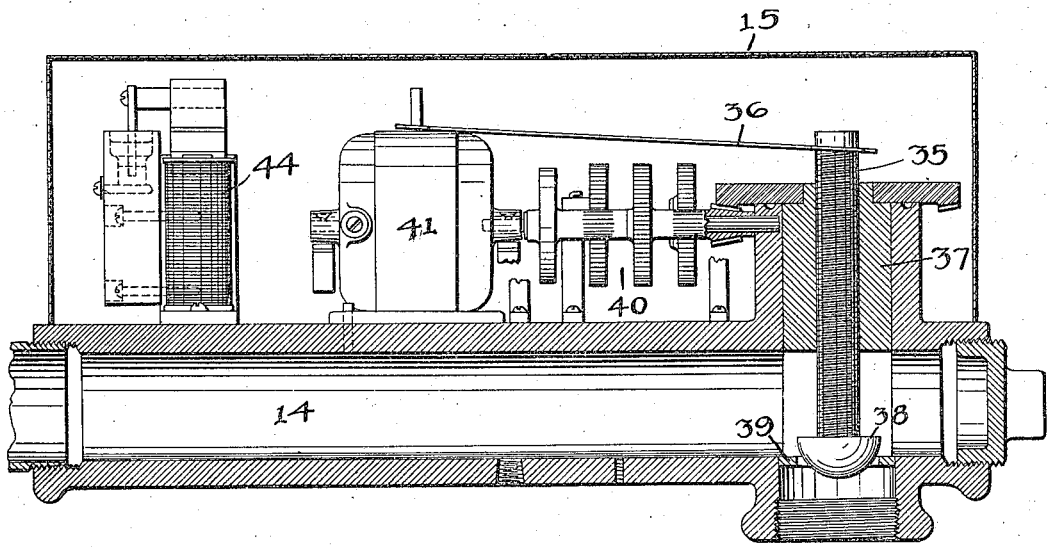

Referring particularly to Figures 5 and 6 for a detailed description of the controlling throttle valve 15 and its actuating mechanism, there is shown a valve provided with a threaded shank 35 held against rotation by means of a readily removable clamping bar 36. The threaded portion of the shank is mounted in a revolvably mounted sleeve 37 so arranged that the rotation thereof in one or the other direction moves the valve head 38 to and from its seat 39, thereby to control the rate of flow of the smoke laden gases as they pass through the pipe 14. The sleeve 37 is operatively connected by means of a gear train 40 with a reversible electric motor 41. The fields 42 of the motor are disposed in circuit as shown in the diagrammatic sketch of Figure 11 with contacts 43 of a relay switch, the solenoid coils 44 of which lead in one direction to the contacts 31 and 32 and which leads in the opposite direction to contacts 45 and 46 on the relay. It will be seen by this construction that the movement of the diaphragm in either direction from normal will cause the motor to revolve in one or the other direction. It is thus apparent that the direction of movement of the motor and the valve controls the variation in pressure in the stack compared to the pressure in the intake tube.

Completing the disclosure in Figure 11 the source of power for the motor circuit is indicated diagrammatically by the main leads 47, the passage of current through which is controlled by the grounded main switch 48. In the circuit leading to the relay is disposed a fuse 50, a pilot light 51 preferably disposed on the stack or in other position to indicate to an operator that the device is in operation and a dis-connecting clip 52. In the motor circuit illustrated there is also shown diagrammatically the motor armature 53 and a resistance lamp 54 in the grounded armature circuit.

In operation and assuming that the motor is active and that the exhaust fan actuated thereby is maintaining a suction on the interior of the tank and is drawing smoke from the stack through the intake past the open valve and through the tank, it will be appreciated that a definite proportion of the stack discharge particles is trapped by the bag in the tank. When the velocity of the smoke within the intake 13 becomes less than the stack velocity, a pressure is produced in the pipe 25 which acts on the diaphragm 27 to swing the same to the right and into contact with the circuit closing contact 32. This tends to throw the relay switch and acts to inaugurate the action of the valve to move the valve into open position or to reverse the direction of movement of the valve motor, if it is moving in a direction to close the valve. When the valve is opened sufficiently to increase the intake velocity above the stack velocity, a negative pressure is produced in the pipe 25 and the reverse action takes place, tending to close the valve.

In its most effective working, the valve is never wide opened nor completely closed but is disposed in an intermediate position so as to allow the intake velocity to fluctuate alternately from slightly below the stack velocity to slightly above the stack velocity, the average being taken as the correct value.

A sample of the smoke contents is taken from the bag from time to time and analyzed. By the usual methods it is merely necessary to multiply the contents of the sample recovered by the factor indicating the relative intake areas of the intake to the discharge capacity of the stack and this gives the total amount of material passing out through the stack during this period of time.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a gas testing device, the combination of a chimney, means providing an intake opening from said chimney, means for maintaining a reduced pressure condition at said intake, and means controlled by variation between the static pressure at the intake and the static pressure in the stack to control the flow through the intake.

2. In a gas testing device the combination of a conduit through which gases are adapted to pass, means automatically controlled by variations in pressure conditions in the conduit and having an intake in said conduit for withdrawing a definite amount of said gases from said passageway at a predetermined velocity.

3. In a gas testing device the combination of a conduit through which gases are adapted to pass, means having an intake in said conduit for withdrawing a definite amount of said gases from said conduit at a predetermined velocity and means controlled by a change of velocity of the gases in said conduit for varying the capacity of said intake to withdraw the gases per unit of time.

4. In a gas testing device the combination of a conduit, a sampling device provided with an intake positioned in said conduit and means controlled by variation between the static pressure at the intake and the static pressure in the conduit for controlling the velocity of gases drawn through the intake.

5. In a gas testing device, the combination of a gas passageway, means for sampling the gases passing through said passageway, said means including an intake positioned in the passageway and means for maintaining a reduced pressure condition in said intake, and means controlled by variation in pressure between the pressure at said intake and the pressure in the passageway thereby to control the reduced pressure conditions in the intake.

6. A fluid sampling device provided with an intake adapted to be positioned in the fluid to be sampled, means for creating a negative pressure in said intake, a valve for controlling the flow through said inlet and fluid actuated means for controlling said valve.

7. A fluid sampling device provided with an intake adapted to be positioned in the fluid to be sampled, means for creating a negative pressure in said intake, a valve for controlling the flow through said inlet and pneumatically actuated means for controlling said valve, said pneumatic means having a pressure receiving inlet adapted to be disposed adjacent said intake and independent of the negative pressure conditions in said intake.

8. In a fluid sampling device, the combination with a variable capacity intake adapted to open to the fluid to be sampled of means acting on said intake to vary its fluid intaking capacity per unit of time and acting to draw the fluid into the same at a velocity substantially equal to the average velocity of the fluid to be sampled.

9. In a fluid sampling device, the combination with an intake adapted to open to the fluid to be sampled, means acting on said intake for drawing the fluid into the same at a predetermined pressure and means controlled by variations in the device for changing the pressure at which said device operates.

10. In a fluid sampling device, the combination of an intake adapted to open to the fluid to be sampled, pneumatically actuated means for controlling the flow through said intake, said pneumatic means including a static head positioned adjacent the intake and a second static head spaced from said intake and means controlled by variation in pressure between the two static heads for controlling the flow through said intake.

11. In a gas testing device, the combination of a valve, a motor for moving said valve to and from its closed position, a relay for controlling the direction of movement of the motor, a pneumatically controlled diaphragm for actuating said relay and a pair of static heads opening respectively to opposite sides of the diaphragm.

12. In a gas testing device, the combination of a valve, a motor for moving said valve to and from its closed position, a relay for controlling the direction of movement of the motor, a pneumatically controlled diaphragm for actuating said relay, a pair of static heads opening respectively to opposite sides of the diaphragm, an intake open to one of said static heads and means for maintaining the reduced pressure conditions in said intake.

13. In a smoke testing device, the combination with a smoke stack of an intake opening from said stack, and automatically actuated means for maintaining the velocity of flow of smoke in the intake substantially the same as the average velocity of flow of the smoke through the stack.

14. In a smoke testing device, the combination with a smoke stack, of an intake opening from said stack, means including a flexible diaphragm for maintaining the velocity of flow of smoke in the intake substantially the same as the average velocity of flow of the smoke through the stack and means for minimizing any action which the suspended matter in the smoke drawn through said intake may have on the action of the diaphragm.

15. In a gas testing device, the combination of a conduit adapted to open into a smoke stack, a valve for controlling the flow of smoke through said conduit, a motor operatively connected to said valve to move the same to and from its closed position, a pressure control device operatively connected to the motor to control the direction of rotation thereof and means open to one side of said pressure controlled means for creating a reduced pressure condition therein and means adapted to be disposed in the smoke stack and open to the opposite side of said pressure controlling means.

Signed at El Paso, in the county of El Paso and State of Texas, this 2nd day of September A. D. 1919.

ROSS F. MacMICHAEL.